(12) United States Patent
Ringseth et al.

(10) Patent No.: US 9,038,087 B2
(45) Date of Patent: May 19, 2015

(54) FENCE ELISION FOR WORK STEALING

(75) Inventors: Paul F. Ringseth, Redmond, WA (US); Bill Messmer, Woodinville, WA (US); Charles David Callahan, II, Seattle, WA (US); Stephen Toub, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1050 days.

(21) Appl. No.: 12/141,107

(22) Filed: Jun. 18, 2008

(65) Prior Publication Data

US 2009/0320027 A1    Dec. 24, 2009

(51) Int. Cl.
  *G06F 9/46*   (2006.01)
  *G06F 13/00*  (2006.01)
  *G06F 9/48*   (2006.01)
  *G06F 9/52*   (2006.01)

(52) U.S. Cl.
  CPC .......... *G06F 9/4881* (2013.01); *G06F 9/52* (2013.01); *G06F 9/522* (2013.01); *G06F 2209/483* (2013.01)

(58) Field of Classification Search
  USPC .......................................... 718/105; 711/153
  See application file for complete search history.

(56) References Cited

U.S. PATENT DOCUMENTS

| | | | |
|---|---|---|---|
| 5,768,594 A | 6/1998 | Blelloch et al. | |
| 5,826,081 A * | 10/1998 | Zolnowsky | 718/103 |
| 6,606,704 B1 | 8/2003 | Adiletta et al. | |
| 7,103,887 B2 | 9/2006 | Shavit et al. | |
| 7,254,597 B2 | 8/2007 | Moir et al. | |
| 7,328,316 B2 | 2/2008 | Moir et al. | |
| 2003/0097395 A1 | 5/2003 | Petersen | |
| 2004/0052135 A1* | 3/2004 | Le | 365/202 |
| 2004/0088702 A1 | 5/2004 | Garthwaite et al. | |
| 2005/0028012 A1* | 2/2005 | Amamiya et al. | 713/201 |
| 2005/0283780 A1 | 12/2005 | Karp et al. | |
| 2007/0250470 A1 | 10/2007 | Duffy et al. | |
| 2009/0025086 A1* | 1/2009 | Fujita et al. | 726/27 |

OTHER PUBLICATIONS

Parallel XML Processing by Work Stealing Lu et al Jun. 26, 2007.*
Dinan et al. "Dynamic load balancing of unbalanced computations using message passing." Parallel and Distributed Processing Symposium, 2007. IPDPS 2007. IEEE International. IEEE, 2007.*
Hendler et al. "Non-blocking steal-half work queues." Proceedings of the twenty-first annual symposium on Principles of distributed computing. ACM, 2002.*
Umatani, Seiji, et al. "Pursuing laziness for efficient implementation of modern multithreaded languages." High Performance Computing. Springer Berlin Heidelberg, 2003.*
"The Data Locality of Work Stealing", Umut A. Acar, Guy E. Bielloch and Robert D. Blumofe, 2000, Proceedings of the Twelfth Annual ACM Symposium on Parallel Algorithms and Architectures, 13 pgs.

(Continued)

*Primary Examiner* — Mengyao Zhe

(74) *Attorney, Agent, or Firm* — Kevin Sullivan; Kate Drakos; Micky Minhas

(57) ABSTRACT

Methods and systems for statistically eliding fences in a work stealing algorithm are disclosed. A data structure comprising a head pointer, tail pointer, barrier pointer and an advertising flag allows for dynamic load-balancing across processing resources in computer applications.

20 Claims, 6 Drawing Sheets

(56) References Cited

OTHER PUBLICATIONS

"A Dynamic-Sized Nonblocking Work Stealing Deque", Danny Hendler, Yossi Lev, Mark Moir and Nir Shavit, Feb. 2006, Published in Journal Distributed Computing—Special Issue: DISC 04, vol. 18, Issue 3, 19 pgs.
"Multithreaded Programming in Cilk", Nov. 11, 2007, Charles E. Leiserson, ACM Supercomputing 2007, Workshop on Manycore and Multicore Computing, 37 pgs.
"A Java Fork/Join Framework", 2000, Doug Lea, Proceeding Java '00 Proceedings of the ACM 2000 Conference on Java Grande, 8 pgs.
"Scheduler Activations: Effective Kernel Support for the User-Level Management of Parallelism", Thomas E. Anderson, Brian N. Bershad, Edward D. Lazowska and Henry M. Levy, Feb. 1992, ACM Transactions on Computer Systems, vol. 10, No. 1, pp. 53-79.
"Programming Parallel Algorithms", Guy E. Blelloch, Mar. 1996, Communications of the AMC, vol. 39, No. 3, pp. 85-97.
"Scheduling Multithreaded Computations by Work Stealing", Robert D. Blumofe and Charles E. Leiserson, Sep. 1999, Published in Journal of the ACM (JACM), vol. 46, Issue 5, pp. 1-29.
"Scheduling Large-Scale Parallel Computations on networks of Workstations", Robert D. Blumofe and David S. Park, 1994, In Proceedings of the Third International Symposium on High Performance Distributed Computing, pp. 96-105.
"The Parallel Evaluation of General Arithmetic Expressions", Richard P. Brent, Apr. 1974, Journal of the Association for Computing Machinery, vol. 21, No. 2, pp. 201-206.
"Strata: A Multi-Layer Communications Library Version 2.0 Beta", Eric A. Brewer and Robert Blumofe, Feb. 15, 1994, MIT Technical Report, pp. 1-28.
"Executing Functional Programs on a Virtual Tree of Processors", F. Warren Burton and M. Ronan Sleep, 1981, In Proceedings of the 1981 Conference on Functional Programming Languages and Computer Architecture, pp. 187-194.
"Cool: An Object-Based Language for Parallel Programming", Rohit Chandra, Anoop Gupta and John L. Hennessy, Aug. 1994, Published in Computer, vol. 27, Issue 8, pp. 13-26.
"The Amber System: Parallel Programming on a Network of Multiprocessors", Jeffrey S. Chase, Franz G. Amador, Edward D. Lazowska, Henry M. Levy and Richard J. Littlefield, Dec. 1989, Published in Proceedings of the 12th ACM Symposium on Operating Systems Principles, pp. 1-20.
"Fine-grain Parallelism with Minimal Hardware Support: A Compiler-Controlled Threaded Abstract Machine", David E. Culler, Anurag Sah, Klaus Erik Schauser Thorsten Von Eicken and John Wawrzynek, Apr. 1991, Fourth International Conference on Architectural Support for Programming Languages and Operating Systems, pp. 1-18.
"Studying Overheads in Massively Parallel Min/Max-Tree Evaluation (Extgended Abstract)", Rainer Feldmann, Peter Mysliwietz and Burkhard Monien, 1994, In ACM Symposium on Parallel Architectures and Algorithms, pp. 94-103.
"DIB—A Distributed Implementation of Backtracking", Raphael Findel and Udi Manber, Apr. 1987, ACM Transactions on Programming Languages and Systems, vol. 9, No. 2, 22 pgs.
"Distributed Filaments: Efficient Fine-Grain Parallelism on a Cluster of Workstations" Booktitle—In First Symposium on Operating Systems Design and Implementation, Vincent W. Freeh, Favid K. Lowenthal and Gregory R. Andrews, 1994, pp. 201-213.
"Enabling Primitives for Compiling Parallel Languages", Seth Copen Goldstein, Klaus Erik Schauser and David Cullter, 1996, In Languages, Compilers and Run-Time Systems for Scalable Systems, 16 pgs.
"Multilisp: A Language for Concurrent Symbolic Computation", Robert H. Halstead, Jr., Oct. 1985, ACM Transactions on Programming Languages and Systems, vol. 7, No. 4, 38 pgs.
"Data Parallel Algorithms", W. Daniel Hillis and Buy L. Steele, Jr., Dec. 1986, Communications of the ACM, vol. 29, No. 12, pp. 1170-1183.

"Computation Migration: Enhancing Locality for Distributed-Memory Parallel Systems", Wilson C. Hsieh, Paul Wang and William E. Weihl, Jul. 1993, Proceedings of the fourth ACM SIGPLAN Symposium on Principles and Practice of Parallel Programming, pp. 239-248.
"A Customizable Substrate for Concurrent Languages", Suresh Jagannathan and Jim Philbin, 1992, In ACM SIGPLAN & apos; 91 Conference on Programming Language Design and Implementation, 13 pgs.
"Massively Parallel Chess" Christopher F. Joerg and Bradley C. Kuszmaul, Oct. 1994, DIMACS '94 Challenge, pp. 1-16.
"Randomized Parallel Algorithms for Backtrack Search and Branch-and-Bound Computation", Richard M. Kart and Yanjun Zhang, Jul. 1993, Journal of the Association for computing Machinery, vol. 40, No. 3, pp. 765-789.
"Mul-T: A High-Performance Parallel Lisp", David A. Kranz, Robert H. Halstead, Jr. and Eric Mohr, Jul. 1989, Proceedings of the ACM SIGLAN 1989 Conference on Programming Language Design and Implementation, pp. 81-90.
"Synchronized MIMD Computing", Bradley C. Kuszmaul, May 1994, MIT Technical Report, pp. 1-162.
"The Network Architecture of the Connection Machine SM-5". Charles E. Leiserson, Zahi S. Abuhamdeh, David C. Dougleas, Carl R. Feynman, Mahesh N. Ganmukhi, Jeffrey V. Hill, W. Daniel Hillis, Bradley C. Kuszmaul, Margaret A. St. Pierre, David S. Wells, Monica C. Wong, Shaw-Wen Yang and Robert Zak, Mar. 21, 1994, ACM Symposium on Parallel Algorithms and Architectures, pp. 1-16.
An Atomic Model for Message-Passing:, Pangfend Liu, William Aiello and Samdeep Bhatt, 1993, Proceedings of the fifth Annual ADM Symposium on Parallel Algorithms and Architectures, pp. 154-163.
"A Type-checking Preprocessor for Cilk 2, a Multithreaded C Language", Robert C. Miller, May 1995, MIT Technical Report, 38 pgs.
"Lazy Task Creation: A Technique for Increasing the Granularity of Parallel Programs", Eric Mohr, David A. Kranz and Robert H. Halstead, Jr., 1991, IEEE Transactions on Parallel and Distributed Systems, pp. 1-23.
"Jade: A High-Level, Machine-Independent Language for Parallel Programming", Martin C. Rinard, Daniel J. Scales and Monica S. Lam, Jun. 1993, Published in Computer, vol. 26, Issue 6, pp. 1-21.
"A Simple Load Balancing Scheme for Task Allocation in Parallel Machines", Larry Rudolph, Miriam Slivkin-Allalouf and Eli Upfal, 1991, Reprinted from the Internet at: http://people.csail.mit.edu/rudolph/Autobiography/LoadBalancing.pdf, pp. 1-9.
"PVM: A Framework for Parallel Distributed Computing", F. S. Sunderam, 1990, Journal Concurrency: Practice and Experience, pp. 1-27.
"Programming a Distributed System Using Shared Objects", Andrew S. Tenenbaum and Henri E. Bai, Jul. 20-23, 1993., Proceedings the 2nd International Symposium on High Performance Distributed Computing, pp. 5-12.
"Communication Complexity for Parallel Divide-and-Conquer", I-Chen Wu and H.T. Kung, Oct. 1-4, 1991, 32nd Annual IEEE Conference on Foundations of Computer Science, San Juan, Puerto Rico, pp. 151-162.
"Speedup Versus Efficiency in Parallel Systems", Derek L. Eager, John Zahorjan and Edward D. Lazowska, Mar. 1989, IEEE Transaction on Computers, vol. 38,No. 3, 16 pgs.
"Executing Multithreaded Programs Efficiently", Robert D. Blumofe, Sep. 1995, MIT Technical Paper, 138 pgs.
"MIMD-Style Parallel Programming Based on Continuation-Passing Threads", Michael Halbherr, Uuli Zhou and Chris F. Joerg, Mar. 7, 1994, Thesis, Conference Massachusetts Institute of Technology, Laboratory for Computer Science, 26 pgs.
"Computation-Centric Memory Models", Matteo Frigo and Victor Luchangco, Jun. 28-Jul. 2, 1998, Proceedings of the 10th ACM Symposium on Parallel Algorithms and Architectures, 10 pgs.
"Hood: A User-Level Threads Library for Multiprogrammed Multiprocessors", Robert D. Blumofe and Dionisios Papadopoulos, Oct. 28, 1998, Technical Report, University of Texas at Austin, pp. 1-14.
"How to Emulate Shared Memory", Abhiram G. Ranade, May 2, 2000, 28h Annual Symposium on Foundations of Computer Science, 25 pgs.

(56) References Cited

OTHER PUBLICATIONS

"Efficient Detection of Determinacy Races in Cilk Programs", Mingdong Fend and Charles E. Leiserson, 1997, Proceedings of the Ninth Annual ACM Symposium on Parallel Algorithms and Architectures, 11 pgs.

"Detecting Data Races in Cilk Programs that Use Locks", Guang-Ien Cheng, Mingdong Feng, Charles E. Leiserson, Keith H. Randall and Andrew F. Stark, Jun. 1998, Proceedings of the Tenth Annual ACM Symposium on Parallel Algorithms and Architecture, pp. 1-12.

"Debugging Multithreaded Programs that Incorporate User-Level Locking", Andrew F. Stark, Jun. 1998, Technical Paper, Massachusetts Institute of Technology, 124 pgs.

"Dag-Consistent Distributed Shared Memory", Robert D. Blumofe, Matteo Frigo, Christopher F. Joerg, Charles E. Leiserson, and Keith H. Randall, Apr. 15-19, 1996, Proceedings of IPPS '96, The 10th International Parallel Processing Symposium, pp. 132-141.

"Cilk: Efficient Multithreaded Computing", Keith H. Randall, 1998, Doctoral Dissertation, Massachusetts Institute of Technology, pp. 1-179.

"Cilk: An Efficient Multithreaded Runtime System", Robert D. Blumofe, Christopher F. Joerg, Bradley C. Kuszmaul, Charles E. Leiserson, Keith H. Randall and Yuli Zhou, Dec. 19, 1995, Conference Journal of Parallel and Distributed Computing, pp. 1-26.

"An Analysis of Dag-Consistent Distributed Shared-Memory Algorithms", Robert D. Blumofe, Matteo Frigo, And Christopher F. Joerg, Jun. 24-26, 1996. Proceedings of the Eighth Annual ACM Symposium on Parallel Algorithms and Architectures, pp. 1-12.

"Algorithms for Data-Race Detection in Multithreaded Programs", Guang-Ien Chanf, Jun. 1998, Technical Report, Massachusetts Institute of Technology, 81 pgs.

"Adaptive and Reliable Parallel Computing on Networks of Workstations", Robert D. Blumofe and Philip A. Lisiecki, Oct. 21, 1996, Proceedings of the USENIX 1997 Annual Technical Symposium, Anaheim, California, pp. 1-15.

"The Weakest Reasonable Memory Model", Matteo Frigo, Oct. 1997, Technical Paper, Massachusetts Institute of Technology, pp. 1-57.

"Thread Scheduling for Multiprogrammed Multiprocessors", Nimar S. Arora, Robert D. Blumofe and C. Greg Plaxton, Jun. 1998, Proceedings of the Tenth Annual ACM Symposium on Parallel Algorithms and Architectures, pp. 1-26.

"The Performance of Work Stealing in Multiprogrammed Environments", Robert D. Blumofe and Dionisios Papadopoulos, May 28, 1998, Technical Report, University of Texas at Austin, Department of Computer Sciences, pp. 1-20.

"The Efficiency of Randomized Parallel Backtrack Search", Yanjun Zhang and Augustyn Ortynski, Oct. 26-29, 1994, Proceedings Sixth IEEE Symposium on Parallel and Distributed Processing, pp. 522-529.

"The Implementation of the Cilk-5 Multithreaded Language", Matteo Frigo, Charles E. Leiserson and Keith H. Randall, Jun. 1998, Proceedings of the 1998 ACM SIGPLAN Conference on Programming Language Design and Implementation, pp. 1-12.

"Storage Management in Virtual Tree Machines", F. Warren Burton, Mar. 1988, IEEE Transactions on Computers, vol. 37, No. 1, pp. 321-328.

"Space-Efficient Scheduling of Multithreaded Computations", Robert D. Blumofe and Charles E. Leiserson, 1993, STOC '93 Proceedings of the twenty-fifth annual ACM symposium on Theory of computing, pp. 362-371.

"Resource Requirements of Dataflow Programs", David E. Culler, May 30, 1988, 15th Annual International Symposium on Computer Architecture, 1988, pp. 141-150.

"Space-Efficient Scheduling of Parallelism with Synchronization Variables", Guy E. Bielloch, Phillip B. Gibbons, Yossi Matias and Girija J. Narlikar, 1997, In Proceeding 95h ACM Symposium on Parallel Algorithms and Architectures, 12 pgs.

"Provably Efficient Scheduling for Languages with Fine-Grained Parallelism", Guy E. Blelloch, Phillip B. Gibbons and Yossi Mattias, Jul. 1995, Proceedings of the 7th Annual AMC Symposium on Parallel Algorthms and Architectures, pp. 1-22.

"Macro-Level Scheduling in the Cilk Network of Workstations Environment", Philip Andrew Lisiecki, May 1996, Technical Paper Massachusetts Institute of Technology, pp. 1-40.

"I-Structures: Data Structures for Parallel Computing", Arvind Nikhil, Rishiyur S. Nikhil and Keshav K. Pingali, Oct. 1989, ACM Transactions on Programming Languages and System, vol. 11, No. 4, pp. 598-632.

"Implementation of Multilisp: Lisp on a Multiprocessor",Robert H. Halstead, Jr., 1984, Proceeding LFP '84 Proceedings of the 1984 ACM Symposium on LISP and Functional Programming, pp. 9-17.

"Enumeration of the Hamiltonian Walks on a Cubic Sublattice", Vijay S. Pande, Alexander Yu Gosberg, Chris Joerg and Yoyoichi Tanaka, Aug. 1996, Journal of Physics A: Mathematical and General, vol. 29, No. 15, pp. 1-4.

"Early Experiences with Olden", Martin C. Calisle, Anne Rogers, John Reppy and Laurie Hendren, Aug. 1993, Languages and Compilers for Parallel Computing, Lexures Notes in Computer Science vol. 768, Abstract only, 1 pg.

"C Threads", Eric C. Cooper and Richard P. Draves, Sep. 11, 1990, Technical Paper Department of Computer Science, Carnegie Mellon University, 23 pgs.

"Guaranteeing Good Memory Bounds for Parallel Programs", F. Warren Burton, Oct. 1996, IEEE Transactions on Software Engineering, vol. 22, Issue 10, Abstract only, 1 pg.

"Communication Complexity for Parallel Divide-and-Conquer", I-Chen Wu and H. T. Kung, Jul. 1991, 32nd Annual IEEE conference on Foundations of Computer Science, San Juan, Puerto Rico, 20 pgs.

"A Simple Load Balancing Scheme for Task Allocation in Parallel Machines", Larry Rudolph, Miriam Slivkin-Allalouf and Eli Upfal, 1991, Proceeding SPAA '91 Proceedings of the Third Annual ACM Symposium on Parallel Algorithms and Architectures, pp. 237-245.

"Lazy Task Creation: A Technique for Increasing the Granularity of Parallel Programs", Eric Mohr, David A Kranz and Robert H. Halstead, Jr., 1991, IEEE Transactions on Parallel and Distributed Systems, Abstract only, 1 pg.

"Synchronized MIMD Computing", Bradley C. Kuszmaul, May 1994, Technical Paper Massachusetts Institute of Technology, pp. 1-162.

"Randomized Parallel Algorithms for Backtrack Search and Branch-and-Bound Computation", Richard M. Karp and Yanjun Zhang, Jul. 1993, Journal of the Association for Computing Machinery, vol. 40, No. 3, pp. 765-789.

"Massively Parallel Chess", Christopher F. Joerg and Bradley C. Kuszmaul, 1994, In Proceedings of the Third DIMACS Parallel Implementation Challenge, Rutgers, 3 pgs.

"DIB—A Distributed Implementation of Backtracking", Raphael Finkel and Udi Manber, Apr. 1987, Journal ACM Transactions on Programming Languages and Systems, vol. 9, Issue 2, Abstract only, 1 pg.

"Executing Functional Programs on a Virtual Tree of Processors", F. Warren Burton and M. Ronan Sleep, 1981, Proceedings of the Functional Programming Languages and Computer Architecture, Abstract only, 1 pg.

"The Parallel Evaluation of General Arithmetic Expressions", Richard P. Brent, Apr. 1974,Journal of the Association for Computing Machinery, vol. 21, No. 2, pp. 201-206.

"Adaptive and Reliable Parallel Computing on Networks of Workstations", Robert D. Blumofe and Philip A. Lisiecki, Oct. 21, 1996, In Usenix 1997 Annual Technical Conference on Unix and Advanced Computing Systems, 6 pgs.

"Bounds on Multiprocessing Timing Anomalies", R. L. Graham, Mar. 1969, SIAM Journal on Applied Mathematics, vol. 17, No. 2, pp. 416-429.

"Bounds for Certain Multiprocessing Anomalies", R. L. Graham, Jul. 1966, The Bell System Technical Journal, vol. XLV, No. 9, pp. 1563-1581.

"WorkCrews: An Abstraction for Controlling Parallelism", Eric S. Roberts and Mark T. Vandevoorde, Apr. 1, 1989, International Journal of Parallel Programming, 1701. 17, No. 4, 32 pgs.

(56) References Cited

OTHER PUBLICATIONS

"Scheduling Multithreaded Computations by Work Stealing", Robert D. Blumofe and Charles E. Lieserson, Sep. 1999, Journal of the ACM, vol. 46, issue 5, pp. 1-12.

"Concert-Efficient Runtime Support for Concurrent Object-Oriented Programming Languages on Stock Hardware", V. Karamcheti and A. Chien, 1993, Proceedings of the 1993 ACM/IEEE Conference on Supercomputing, Abstract only, 1 pg.

"Executing Multithreaded Programs Efficiently", Robert D. Blumofe, Sep. 1995, Technical Paper Massachusetts Institute of Technology, 35 pgs.

"The Cilk System for Parallel Multithreaded Computing", Christopher F. Joerg, Jan. 1996, Technical Paper Massachusetts Institute of Technology, 39 pgs.

"Game Tree Search on a Massively Parallel System", R. Feldmann, P. Mysliwietz and B. Monien, 1993, Advanced in Computer Chess 7, Abstract only, 1 pg.

"Control of Parallelism in the Manchester Dataflow Machine", Carlos A. Ruggiero and John Sargeant, 1987, In Functional Programming Languages and Computer Architecture, No. 274 in Lecture Notes in Computer Science, Abstract only, 1 pg.

"A Multithreaded Implementation of Id using P-RISC Graphs", Rishiyur S. Nikhil, 1994, Languages and Compilers for Parallel Computing, Lecture Notes in Computer Science, vol. 768, Abstract only, 1 pg.

"Cid: A Parallel, "Shared-Memory" C for Distributed-Memory Machines", Rishiyur S. Nikhil, 1995, Languages and Compilers for Parallel Computing, Lecture Notes in Computer Science, vol. 892, Abstract only, 1 pg.

* cited by examiner

FENCE ELISION FOR WORK STEALING

BACKGROUND

Scheduling multithreaded computations on multiprocessor machines has been the source of much research. To execute multithreaded computations, the operating system runs a collection of kernel-level processes, one per processor, and each of these processes controls the execution of multiple computational threads created dynamically by the executed program. The scheduling problem is that of dynamically deciding which thread is to be run by which process at a given time, so as to maximize the utilization of the available computational resources (processors). Thread is short for thread of execution. A thread is a sequence of instructions which may execute in parallel with other sequences of instructions.

Most of today's multi-processor machines run programs in a multi-programmed mode, where the number of processors used by a computation grows and shrinks over time. In such a mode, each program has its own set of processes, and the operating system chooses in each step which subset of these processes to run, according to such factors as the nature, size, and number of processors available for that program at the time, the amount of work load waiting to be performed, the nature, size, and number of memory modules, and so on. Therefore the scheduling algorithm is dynamic (as opposed to static): at each step it schedules threads onto processes, without knowing which of the processes or work tasks are going to be run.

When a program is executed on a multiprocessor machine, the threads of computation are dynamically generated by the different processes, implying that the scheduling algorithm generated in a scheduler has processes load balance the computational work in a distributed fashion. The challenge in designing such distributed work scheduling algorithms is that performing a re-balancing, even between a pair of processes, requires the use of costly synchronization operations.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, systems and methods for scheduling parallel processing or concurrent work loads across processors are illustrated. The objective is to distribute what could possibly be made parallel and distribute the work (e.g., processor executions) among processor cores available in the system thereby improving processor performance.

Methods and systems are disclosed which synchronize concurrent processing for claiming operations, such as push, pop and/or steal operations, between locally owning processors of a data structure and foreign processors that are among the multiple processors on a multi-processor machine. The data structure is a lock free, wait free, structure that elides/omits the majority of fences in a work stealing pop algorithm (e.g., a foreign processor (e.g., a processor not owning the data structure) stealing work from other processors by removing work items (steal operation) and/or work descriptors off a local processor). Work stealing is a many-core parallelism technique where processors without tasks assigned to be processed will dynamically search for tasks to steal and execute for work scheduled on other processors with the result of efficient and effective dynamic load-balancing across all processing resources. Popping/pop operation refers to taking or grabbing work off of a data structure by a local processor. Stealing/steal operation is what foreign processors do (e.g., the act of trying to grab the least recently queued item). For example, stealing refers to a foreign processor grabbing work off of a local processor's data structure.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
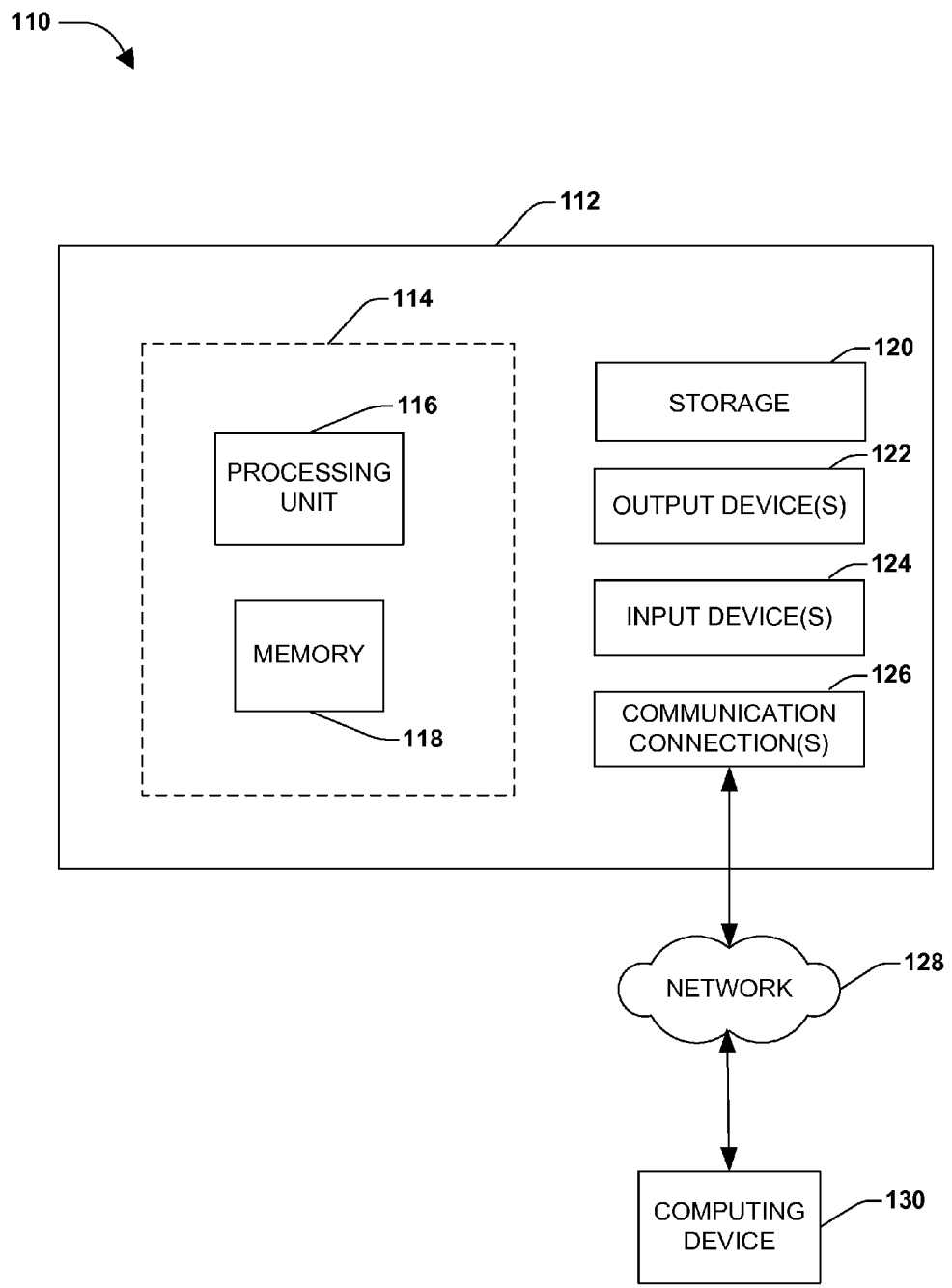
FIG. 1 illustrates an exemplary computing environment wherein one or more of the provisions set forth herein may be implemented.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Parallel processing comprises the use of more than one CPU to execute a program. Ideally, parallel processing makes a program run faster because there are more engines (CPUs) running it. In practice, it is often difficult to divide a program in such a way that separate CPUs can execute different portions without interfering with each other. Therefore, methods of improving the algorithm for allowing processors that have free resources to take work from processors that are not free are illustrated herein.

FIG. 1 and the following discussion provide a brief, general description of a suitable computing environment to implement embodiments of one or more of the provisions set forth herein. The operating environment of FIG. 1 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

FIG. 1 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 1 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 1 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection(s) 126 that allows device 112 to communicate with other devices. Communication connection(s) 126 may include, but is not limited to, a modem, a Network Interface Card (NIC), an integrated network interface, a radio frequency transmitter/receiver, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device(s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 130 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Figure 2:
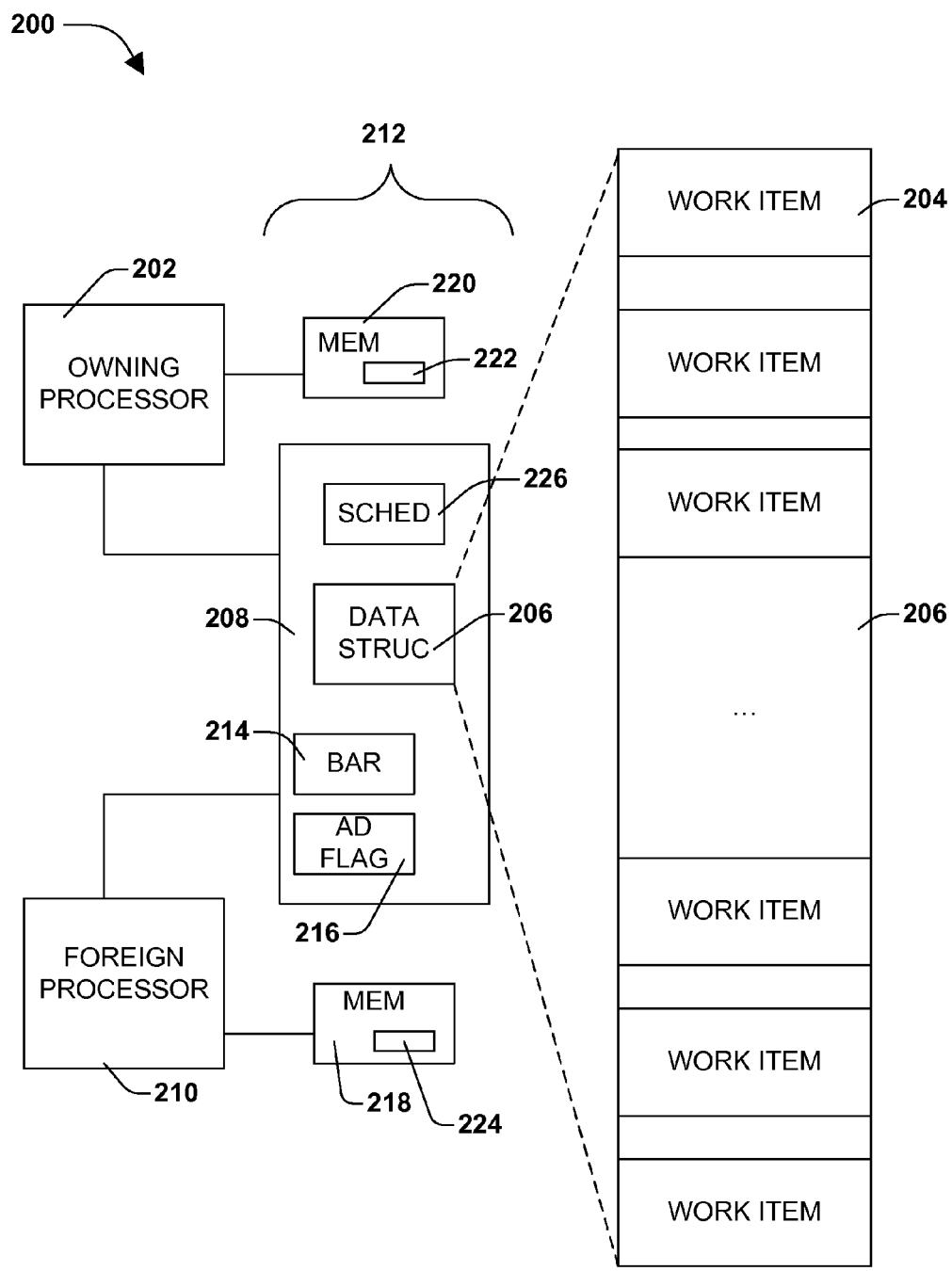
FIG. 2 is a component block diagram illustrating an exemplary system for work stealing.

Referring now to FIG. 2 is a multi-processor configuration 200 for work stealing operations to be executed amongst processors working concurrently that is one example in which methods for efficient and effective dynamic load balancing (e.g., balancing work loads among processors) across all processing resources can be employed. FIG. 2 illustrates in general one of a wide variety of multiprocessor configurations comprising implementations in which illustrated local memory sections, 218 and 220, and a shared memory portion 208 correspond to one or more underlying physical structures (e.g., memory, registers, buffers, or other storage), which may be shared, distributed or partially shared and partially distributed.

FIG. 2 illustrates the multiprocessor configuration 200 where the owning processor 202 places work items 204 for the work that could possibly be done concurrently, or in parallel onto a data structure 206 which can be, for example, a work stealing queue. Operations such as push operations or pop operations are methods in which a new item or chore is placed on the data structure 206 and removed from the data structure 206 respectively (e.g., push is putting on, and pop is taking off). The data structure 206 could be in the form of a list, a stack or a queue, for example. A stack is a list of data elements, usually words or bytes, with the accessing restriction that elements can be added or removed at one end of the list. This end is called the top of the stack, and the other end is called the bottom.

FIG. 2. Illustrates an owning processor 202 and a foreign processor 210 that access memory circuitry 212 comprising processor instructions. The memory circuitry 212 comprises the shared memory portion 208 comprising the data structure 206. In addition, memory circuitry 212 comprises local memory sections 218 and 220, respectively accessible by execution threads executing on the owning processor 202 and/or foreign processor 210. The local memory sections 218 and 220 can respectively comprise pointers 222, and 224, such as a head pointer or a tail pointer, for example. The memory circuitry 212 can comprise a portion with a flag 216, such as an advertisement flag, and also a portion with a pointer 214, such as a barrier pointer, as one embodiment of the illustration. A pointer references an address to a memory.

In other realizations, the data structure 206 may be encoded in the shared memory portion 208 and local memory section 218 and 220 may reside in or on the same physical structures. Similarly, shared memory portion 208 does not need to correspond to a single physical structure. Shared memory portion 208 may correspond to a collection of sub-portions that can be associated with a processor, respectively. The multi-processor configuration can provide communication mechanism, such as message passing links, bus protocols, etc., to present the collection of sub-portions as shared storage. In addition, local memory section 218, and 220 can correspond to one or more underlying physical structures including addressable memory, register, stack, queue or other storage, such as the data structure 206, as local to corresponding processors. Furthermore, the shared memory portion 208 can comprise a scheduler 226 comprising software portions that allocate sections of the data structure 206 for various operations to be performed on it.

A queue is another data structure where data is stored and retrieved from it in a first-in-first out (FIFO) basis. Thus, if the queue grows in the direction of increasing addresses in the memory, new data are pushed at the back (high-address end) and popped from the front (low-address end) of the queue. The data structure 206 can have work pushed on and then have work popped off for execution by a push operation or a pop operation respectively.

Last-in-first-out (LIFO) is one way of describing an exemplary data structure, such as a stack where the last work item or data item placed on the stack is the first one removed when a retrieval process begins. A push operation and a pop operation describe placing a new item on the stack (for example, the work item 204) and removing the top item from the stack, respectively.

Multi-threaded programming has often used locks to synchronize access to shared resources. Synchronization primitives such as mutexes, semaphores, and critical sections are all mechanisms by which a programmer can ensure that certain sections of code do not execute concurrently if doing so would corrupt shared memory structures. If one thread attempts to acquire a lock that is already held by another thread, the thread will block until the lock is free.

The data structure 206 can be utilized for work stealing operations taking place in concurrent or parallel processing. The data structure 206 in one embodiment can comprise a top and a bottom in which foreign processors can steal work items from it by using a steal operation, and local owning processors that own the data structure can push and pop work items on and off respectively by a push operation and a pop operation. The data structure 206 is a lock free, wait free structure that eliminates the majority of fences in the pop/push operations performed by the owning processor.

Figure 3:
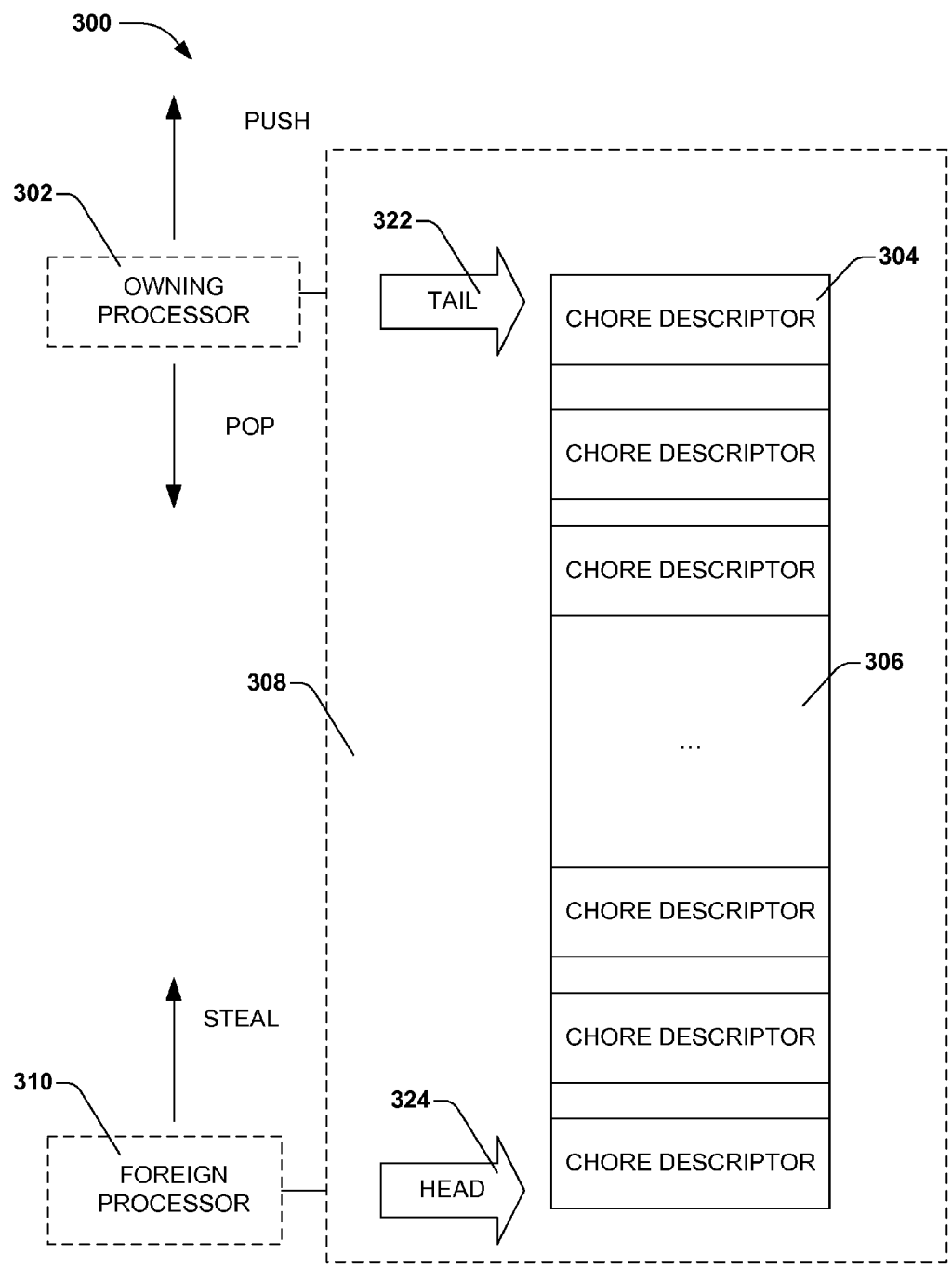
FIG. 3 is a component block diagram illustrating an exemplary system for work stealing.

FIG. 3 illustrates an exemplary system 300 of work stealing for scheduling parallel processing or concurrent work loads across processors. FIG. 3 illustrates shared memory 308 that can comprise a work stealing data structure 306 for use in concurrent processing with multiple processors on a system. Work stealing algorithms are one method to schedule concurrent work loads across processors in parallel processing to ensure proper synchronization and improved performance in the system. Work stealing operations are the basis of work stealing algorithms which allow for work items on the data structure 306 to be given to foreign processors 310 that may be idle.

A stealing operation can be performed in a first-in-first out (FIFO) basis by the foreign processor 310. This may be done by a local/owning processor 302 first receiving work in its data structure 306, such as a work stealing queue, for example. Work items 304 may be removed from the front (low-address end) of the queue by the foreign processor as a steal operation. The data structure 306 can have work pushed on by the local processor 302 and also have removed by a foreign processor 310 for execution by a push operation or a steal operation respectively.

In one embodiment, the foreign processor 310, which is a processor other than the local owning processor 302, can examine other data structures such as the data structure 306 or work stealing queue after processing the chore descriptors local to it. In other words, if the foreign processor can not find anything in its own queue, it can attempt to steal from other queues the amount of work that it could possibly execute. This is the functioning essence of work stealing operations.

The data structure 306 behaves in a Last-In-First-Out (LIFO) basis from the perspective of the owning processor 302 at a tail end (e.g., end with a tail pointer) and in a First-In-First-Out (FIFO) basis according to the foreign processor 310 at a head end (e.g., end with a head pointer). The data structure 306 is referred to herein as a work stealing queue which is not limited to any particular type of data structure.

Furthermore, work items such as the work items 304 of FIG. 3 may also comprise chore descriptors or may also comprise work tasks for processors to carry out by processing. A descriptor can be a non-stock item like labor or work, and may also be an attribute with binding behavior, for example, a chore descriptor. The term "work item" is meant to describe a number of possible items which may be work for processing or describe the work needing to be done.

The data structure 306 of FIG. 3 is associated with the processing resources of a system, for example, the owning processor 302. Various operations may be performed with the data structure 306 for enabling parallel processing to be scheduled efficiently. For example, push operations, pop operations, and/or steal operations are operations that may be performed. The processing resource owning the data structure 306, such as the owning processor 302, can push and pop from a tail end at a tail pointer 322 in LIFO fashion by push operations and pop operations. The foreign processor 310 can steal by FIFO removal from a head end at a head pointer 324 of the data structure 306.

Figure 4:
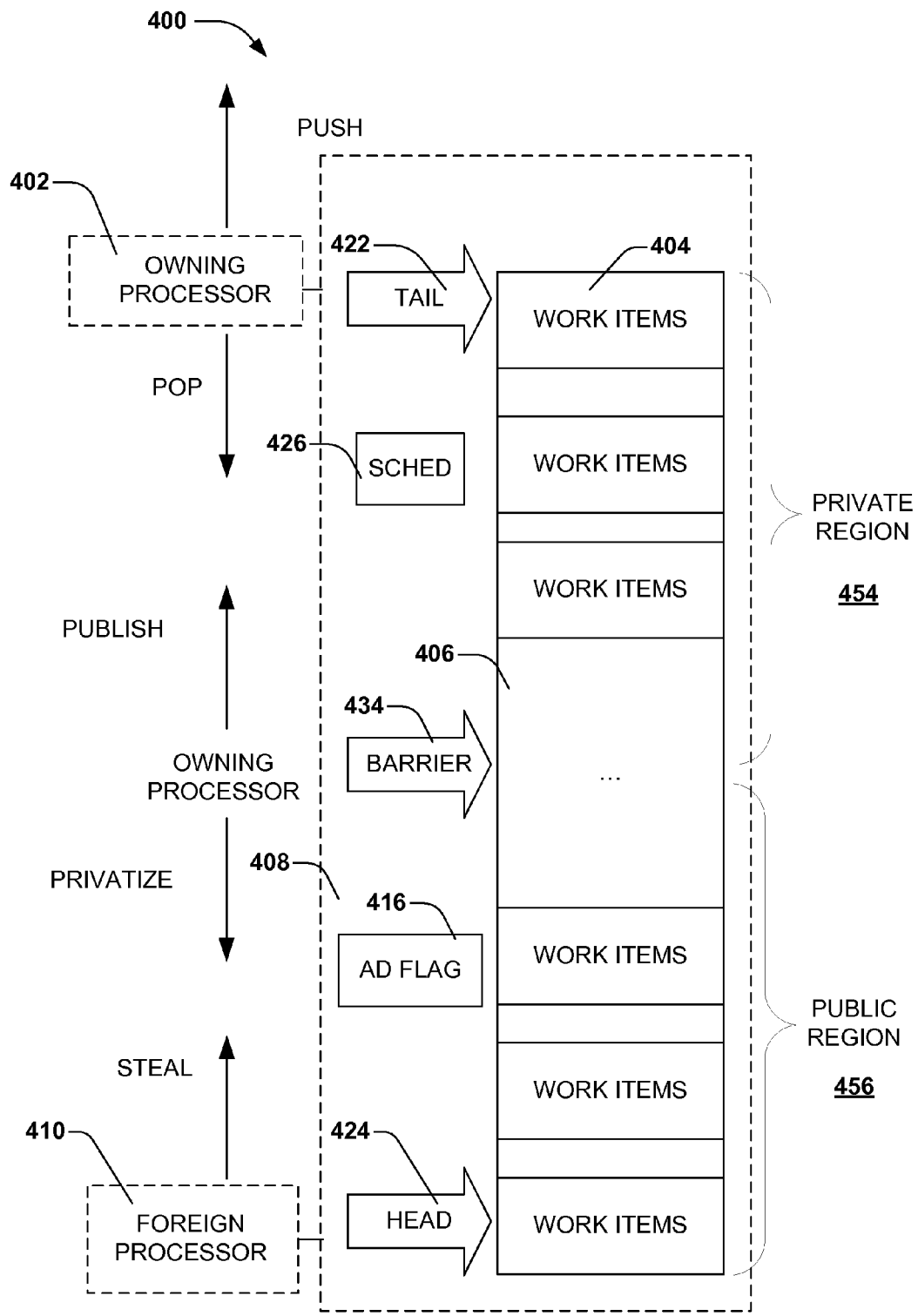
FIG. 4 is a component block diagram illustrating an exemplary system for work stealing.

FIG. 4 illustrates an exemplary system 400 for work stealing. In one embodiment, a work stealing queue 406 can be on a shared memory 408 that synchronizes work items 404 for concurrent processing. One embodiment of FIG. 4 illustrates the work stealing queue 406 as a lock free data structure (e.g., no execution threads can put a hold or lock on work items therein preventing progress for synchronization). In order to synchronize between the operations of an owning processor 402 and a foreign processor 410 the work stealing queue comprises a lock free data structure where no lock on any chore descriptor or work item 404 is held.

If the distance between work items 404 close to a tail pointer 422 and those closer to a head pointer 424 is far apart, synchronization is not as much of a concern, but as the work items 404 popping off from both ends of the data structure 406 get closer together there is a possibility that the owning processor 402 (popping off work items 404 at the tail pointer 422 end), and the foreign processor 410, (stealing at the head pointer 424 end), could try to grab the same work item. The data structure 406 of FIG. 4 synchronizes work items 404 by implementing a lock free and wait free data structure.

In one embodiment, the data structure 406 is a lock free algorithm that uses the processor intrinsic to try to synchronize it. There is no mutual exclusion like a traditional mutex or assembler as with lock algorithms. In order to be able to detect the case where a pop operation from the owning processor 402 and a steal operation from the foreign processor 410 have interleave (e.g., they try to grab the same element), the changes to the head pointer 424 and 422 are made visible to foreign processors, (e.g., processor other than the owning processor 402).

When memory operations, such as a write operation, occur from memory they may go into cache, or a processor store buffer, and a foreign processor (e.g., a processor other than that performing the operation) does not necessarily see that write operation. For example, in traditional algorithms, when a owning processor pushes onto the work stealing queue it may not update or it doesn't expense that operation, a foreign processor might not yet see that push in order to steal. In that particular case the foreign processor may not steal something or it may not see that work is ready to do. Therefore, every time a pop operation is executed there is a memory barrier so it does an interlocked decrement on the pointer or an equivalent on whatever processor architecture being used.

In one embodiment, the pointers of the work stealing queue 406, the head pointer 424 and the tail pointer 424, are made visible to the other processors. Instead of putting a memory barrier on the data structure like doing an operation similar to an interlock exchange or interlock increment/decrement on the processor for foreign processors to see it, overhead is saved by using a scheduler to allocate different regions of work stealing queue 406.

FIG. 4 illustrates one embodiment of the disclosure where a scheduler 426 allocates a region of the work stealing queue 406 that is private. The scheduler may be software that assigns processes, for example. The owning processor 402 only is able execute operations upon a private region 454. The foreign processor(s) 410 are allowed to touch a public region 456. A barrier pointer 434 is kept between the private region 454 and public region 456 that delineates between the two regions.

Because the owning processor 402 is controlling what happens in the private region 454, no memory barriers are implemented on the work stealing queue 406. Anything that happens inside the public region still has to be sent, therefore, the head pointer utilizes a memory barrier for it to be changed. If the foreign processor 410 tries to execute steal operations on the work stealing queue 406, and it sees there is work, but it is not allowed to steal it, an advertisement flag 416 is set visibly (e.g., the flag is fenced) to other processors (e.g., the foreign processor can set the flag 416). The advertisement flag 416 indicates to the owning processor 402 that the foreign processor 410 has tried to steal from the work stealing queue 406 and was not allowed. For example, this may occur when the entire work stealing queue is privatized and/or little or no public region is allocated by the scheduler.

When the owning processor 402 does an operation, such as a claiming operation like a pop operation in the private region, it checks the flag 416. The flag can also be checked when a push operation is performed as well. The owning processor 402 checks the advertisement flag 416 and publishes if it is set. Then the owning processor 402 clears the advertisement flag 416 without fence(s) (e.g., no memory testing is done, it just sets the flag). If the flag happens to be set already then it will make more of the work sharing queue 406 public through the scheduler 426. Owning processors 402 are able to do this operation called publishing, foreign processors 410 are not.

The local owning processor 402 updates the tail pointer 422 as push and pop operations are executed, and the foreign processor 410 updates the head pointer 424 as steal operations occur. In one embodiment, illustrated by FIG. 4 the barrier pointer 434 is a third pointer in the shared memory 408 for the work stealing queue 406. The private region 454 is the region between the tail pointer 422 and the barrier pointer 434. The public region 456 is the region between the barrier pointer 434 and the head pointer 424. In one embodiment, when the private region 454 and the public region 456 need to be changed based on the work items 404 on the data structure the barrier pointer 434 gets moved. The barrier pointer 434 gets moved with a memory fence.

In one embodiment, the barrier pointer 434 gets moved when the owning processor 402 publishes work items 404. The barrier pointer 434 can also be moved when the owning processor 402 privatizes the work stealing queue 406 or work items 404. The owning processor 402 is configured to privatize the data structure by moving the barrier pointer 434 towards the head pointer 424. In this regard, the entire data structure may be privatized or only a portion of it.

In one embodiment, the owning processor 402 may be within a computer system in a parallel configuration with a foreign processor 410 and is configured to privatize the work stealing queue 406 by resetting the barrier pointer 434 substantially equal to the head pointer 424. Upon privatizing the work stealing queue 406 entirely no foreign processor 410 has access to the work items 404 on the queue. In addition, the private region 454 may be increased in size by moving the barrier pointer 434 towards the head pointer 424 without necessarily resetting it to be substantially equal. In this case the private region 454 and public region 456 exists when foreign processors may steal work items from the public region.

In one embodiment, privatizing the work stealing queue 406 by setting the barrier pointer 434 equal to the head pointer 424 or moving the barrier pointer 434 towards the head pointer 424 occurs when a claiming operation, such as a pop operation by the owning processor, is executed and/or when a delta number that is a predetermined threshold has been met. This predetermined threshold is a heuristically determined number chosen by the scheduler 426 that indicates the distance between the tail pointer 422 and head pointer 424. In one example, once the predetermined threshold has been met the work stealing queue 46 can be privatized by the owning processor 402.

In one embodiment, the work stealing queue 406 operates as an array for work items 404 that are made available to the foreign processor 410 to steal when the owning processor 402 publishes the work items 404. The owning processor 402 publishes work items 404 on the work stealing queue 406 by moving the barrier pointer 434 towards the tail pointer 422 on the data structure. The owning processor will then clear the advertisement flag 416. The advertisement flag 416 is set by the foreign processor when at least one work item is on the work stealing queue 406 and the foreign processor is unable to perform a steal operation. The foreign processor 410 can execute a steal operation once its queue is clear and it is ready to execute additional work items.

The tail pointer 422 is updated without any memory fences in one example. The head pointer 424 can be updated by a single foreign processor and can be guarded with a fence in one example. In one example, the barrier pointer 434 is updated (e.g., moved) with a fence, except when pushing of new work items when the advertisement flag is clear (e.g., initially when the barrier pointer and tail pointer are kept in parity, as discussed infra).

Figure 5:
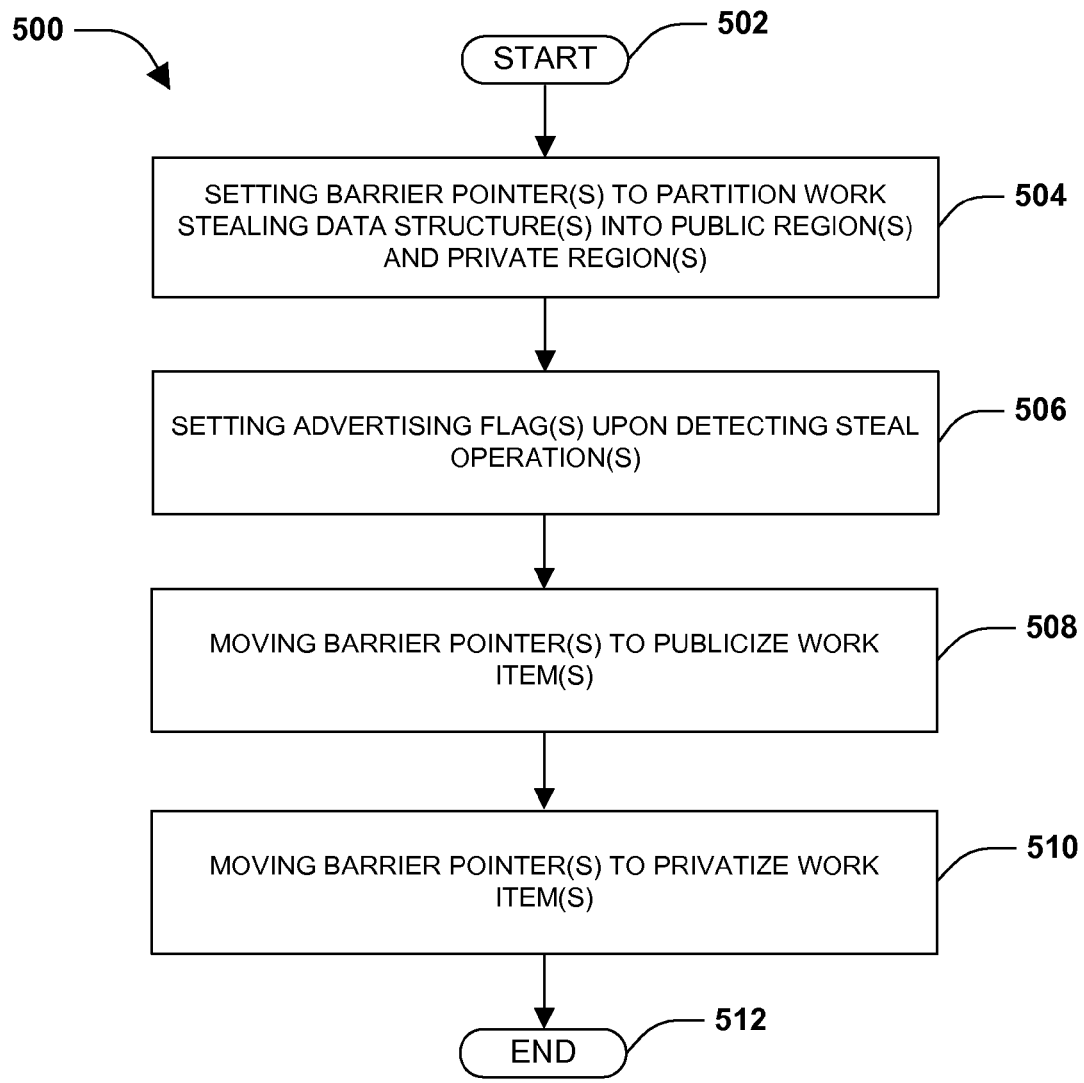
FIG. 5 is a flow chart illustrating an exemplary method of work stealing.

Referring now to FIG. 5, further aspects of the disclosure relate to methods where FIG. 5 illustrates an exemplary method 500 of fence elision for work stealing. While the exemplary method 500 is illustrated and described below as a series of acts or events, it will be appreciated that the present disclosure is not limited by the illustrated ordering of such acts or events. For example, some acts may occur in different orders and/or concurrently with other acts or events apart from those illustrated and/or described herein. In addition, not all illustrated steps may be required to implement a methodology in accordance with the present disclosure.

The method 500 of FIG. 5 begins at 502 illustrating an example of the present disclosure for a work stealing algorithm that can be implemented in a computer system for synchronizing concurrent processing. The method 500 allocates work items from a work stealing data structure comprising a barrier pointer, a tail pointer, a head pointer, and an advertising flag.

A scheduler allocates a public region and a private region on the data structure in order to make the work stealing data structure operable to allow for push and pop operations by an owning processor and steal operations thereon by a foreign processor. At 504 barrier pointers(s) are set to partition work stealing data structure(s) into public region(s) and private region(s). The data structure is lock free, wait free and free of most memory fences for push and pop operations. Only the owning processor can touch the private region, and as such, operations which modify the data structure in the private region need not be fenced. The public region can be accessed by foreign processors doing a steal operation much as a steal in common work stealing algorithms, however, foreign processors cannot steal into the private region. In addition, the owning processor cannot pop into the public region without moving the barrier pointer.

Initially the barrier pointer, head pointer and tail pointer are identical. When a push occurs, the barrier pointer and tail pointer are updated without a memory barrier. Initially the barrier pointer tracks the tail pointer allowing for the work stealing queue to be public and thus provide fully for steal operations. This does not need to be the case, but is one embodiment of the disclosure. The barrier pointer may likewise track the head pointer to provide more for pop operations. Both operations are claiming operations for claiming a work item off of the data structure.

If a steal operation fails when there are work elements in the data structure (tail is greater than head) and the data structure is privatized, the foreign processor advertises its intent to steal through an advertising flag at 506. Whenever a push or pop operation occurs by the owning processor, the owning processor checks the advertising flag. If the advertising flag is set the owning processor moves the barrier forward towards the tail and clears the advertising flag, therein publishing work items or chore descriptors in the data structure for stealing at 508. At 512 the method ends. A claiming operation may be a push/pop operations and/or a steal operation.

In one embodiment, a delta is heuristically chosen by the scheduler. When a pop occurs and a distance between the tail pointer and the head pointer is greater than the delta, which a predetermined threshold value heuristically chosen, then the barrier pointer is reset to be identical to the head pointer, therein privatizing the data structure at 510. The delta is dependent upon what the system looks like, for example, the number of processors, or what the work load looks like. In some cases, the delta is zero; meaning stealing is through an advertising pass (e.g., when the advertising flag is set). This can be the case when the pattern or shape of incoming work cannot be readily modeled.

When the region between the barrier pointer and the head pointer gets above a delta and pop operations are occurring from the local processor, the owning processor at that point has begun executing work. The owning processor can change and privatize the entire queue until a foreign processor advertises that it wants to steal. The owning processor may then adjust the barrier so that there is again a public region. The public and private regions are quite dynamic therefore and constantly changing.

The method of FIG. 5 synchronizes owning processors and foreign processors for parallel processing by ensuring that push/pop operations and steal operations are not executed interleaved. The head pointer and tail pointer are volatile as they can be updated from different operating system threads. The head pointer is only updated by foreign threads as they steal a task or work item from the work stealing queue. By putting a lock in steal there is at most one foreign thread changing the head pointer at a time. The tail pointer is updated by the owning thread.

Figure 6:
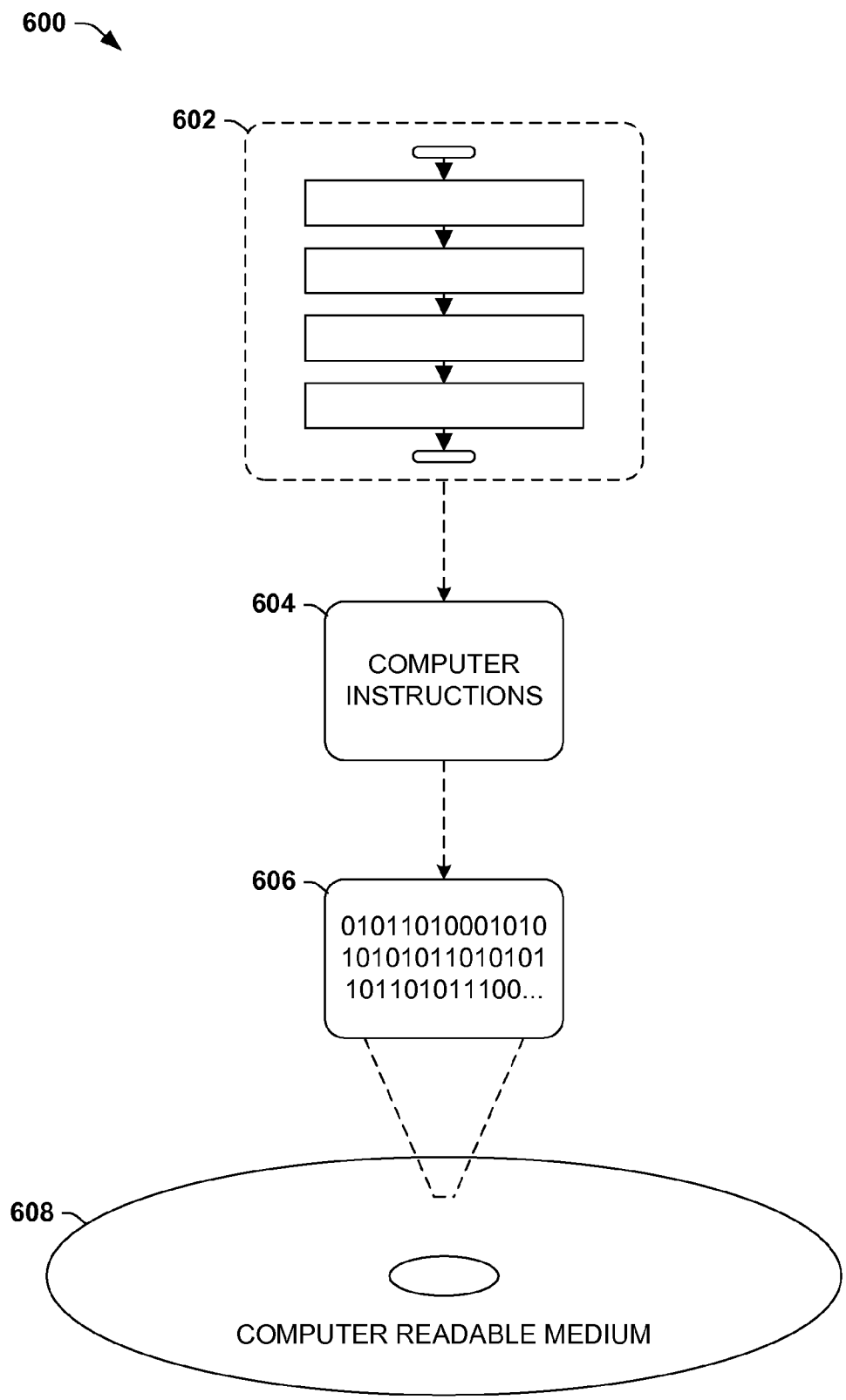
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as the exemplary method 500 of FIG. 5, for example. In another such embodiment, the processor-executable instructions X may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for allocating work items in a work stealing data structure, comprising:
    setting a barrier pointer to partition the work stealing data structure into a public section and a private section, the private section comprising one or more work items to be performed by an owning processor and the public section comprising one or more work items to be performed by one or more foreign processors;
    executing a steal operation via a first foreign processor of the one or more foreign processors to acquire, by the first foreign processor, a first work item of the one or more work items comprised in the public section;
    setting an advertising flag upon detecting an attempt to perform a second steal operation by a second foreign processor of the one or more foreign processors when no work items are remaining in the public section to generate a set advertising flag; and
    moving the barrier pointer to cause a second work item comprised in the private section to become comprised in the public section based at least in part upon detecting the set advertising flag, at least some of the method implemented at least in part via a processing unit.

2. The method of claim 1, comprising:
    moving the barrier pointer to privatize a third work item comprised in the public section such that the third work item becomes comprised in the private section.

3. The method of claim 1, boundaries of the private section defined by a tail pointer and the barrier pointer and boundaries of the public section defined by a head pointer and the barrier pointer, the owning processor configured to execute a pop operation from the tail pointer and the one or more foreign processors configured execute a steal operation from the head pointer.

4. The method of claim 1, comprising:
    clearing the set advertising flag responsive to the moving.

5. The method of claim 1, comprising detecting, by the owning processor, the set advertising flag upon the owning processor performing at least one of a push operation or the pop operation.

6. The method of claim 3, the moving comprising:
    moving the barrier pointer towards the tail pointer.

7. The method of claim 6, the moving the barrier pointer towards the tail pointer comprising moving the barrier pointer towards the tail pointer via a first memory fence.

8. The method of claim 1, comprising:
    executing a pop operation via the owning processor in a last-in-first-out (LIFO) basis.

9. The method of claim 1, the work stealing data structure being lock free.

10. A computer-readable memory comprising computer executable instructions that when executed perform a method for allocating work items in a work stealing data structure comprising a public section and a private section, the private section comprising one or more work items to be performed by an owning processor and the public section comprising one or more work items to be performed by one or more foreign processors, the method comprising:
    executing a steal operation via a first foreign processor of the one or more foreign processors to acquire, by the first foreign processor, a first work item of the one or more work items comprised in the public section;
    setting an advertising flag upon detecting an attempt to perform a second steal operation by a second foreign processor of the one or more foreign processors when no work items are remaining in the public section to generate a set advertising flag; and
    moving a barrier pointer dividing the public section and the private section to cause a second work item comprised in the private section to become comprised in the public section based at least in part upon detecting the set advertising flag.

11. The computer-readable memory of claim 10, the method comprising clearing the set advertising flag responsive to the moving.

12. The computer-readable memory of claim 11, the clearing comprising clearing the set advertising flag without utilizing one or more memory fences.

13. The computer-readable memory of claim 10, the method comprising:
executing a pop operation via the owning processor in a last-in-first-out (LIFO) basis.

14. The computer-readable memory of claim 10, comprising, before the setting, determining that one or more work items are remaining in the private section of the work stealing data structure.

15. A system configured to facilitate work stealing, comprising:
one or more processing units; and
memory configured to store instructions that when executed by at least one of the one or more processing units perform a method, comprising:
setting a barrier pointer to partition a work stealing data structure into a public section and a private section, the private section comprising one or more work items to be performed by an owning processor and the public section comprising one or more work items to be performed by one or more foreign processors;
executing a steal operation via a first foreign processor of the one or more foreign processors to acquire, by the first foreign processor, a first work item of the one or more work items comprised in the public section;
setting an advertising flag upon detecting an attempt to perform a second steal operation by a second foreign processor of the one or more foreign processors when no work items are remaining in the public section to generate a set advertising flag; and
moving the barrier pointer to cause a second work item comprised in the private section to become comprised in the public section based at least in part upon detecting the set advertising flag.

16. The system of claim 15, the private section inaccessible to the one or more foreign processors.

17. The system of claim 15, the method comprising:
adding a new work item to the private section.

18. The system of claim 15, the executing comprising executing the steal operation in a first-in-first-out (FIFO).

19. The system of claim 15, the method comprising:
clearing the set advertising flag responsive to the moving.

20. The system of claim 15, the method comprising executing a pop operation via the owning processor in a last-in-first-out (LIFO) basis.

* * * * *